May 23, 1950    M. TURCHAN ET AL    2,508,587
COMBINATION JACK SCREW AND HYDRAULIC
CYLINDER FOR MACHINE TOOLS
Filed Dec. 7, 1945    2 Sheets-Sheet 1

INVENTORS
MANUEL TURCHAN &
CURTIS WALKER
BY Robert A. Sloman
ATTORNEY

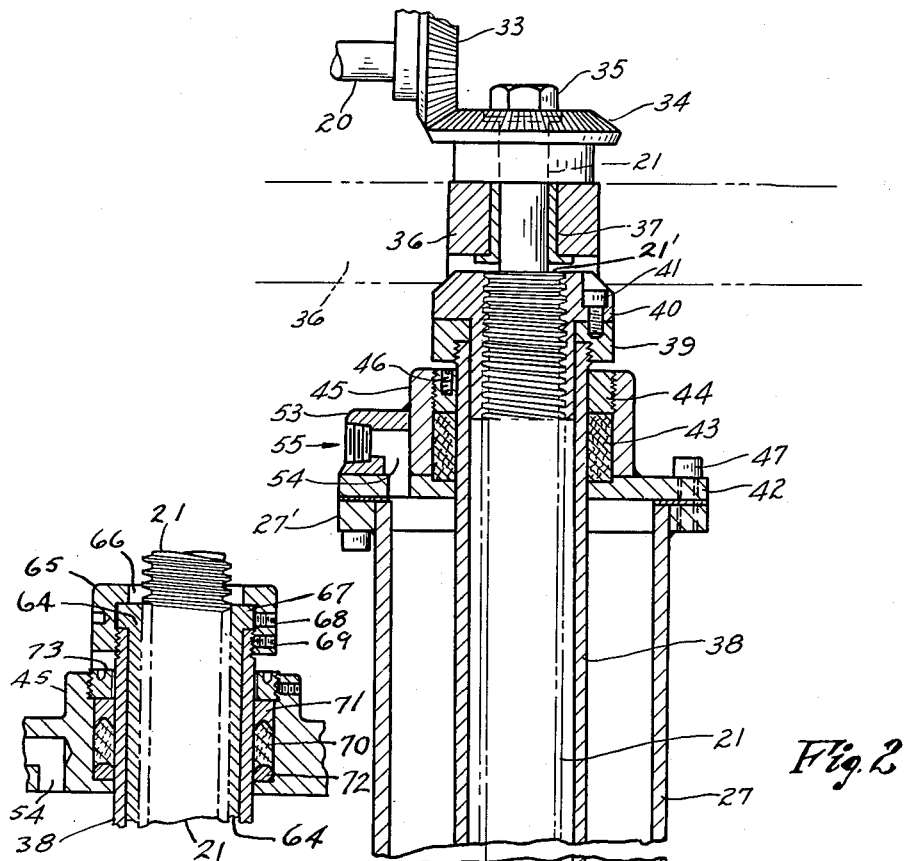

Patented May 23, 1950

2,508,587

UNITED STATES PATENT OFFICE 2,508,587

COMBINATION JACKSCREW AND HYDRAULIC CYLINDER FOR MACHINE TOOLS

Manuel Turchan, Dearborn, and Curtis Walker, Detroit, Mich.

Application December 7, 1945, Serial No. 633,566

3 Claims. (Cl. 254—93)

This invention relates to a combination hydraulic cylinder and screw jack for a machine tool, and more particularly for the vertically adjustable work table supporting knee thereof.

Heretofore, in providing hydraulic cylinders for the machine knee to effect tracer controlled hydraulic vertical adjustments thereof, it was the custom to position a pair of hydraulic cylinders upon the base of said machine on opposite sides of its conventional manually operable screw jack.

The present invention has for its principal object the incorporating of one tracer controlled cylinder with the screw jack itself as a single unit.

It is the object of this invention to provide a hydraulic cylinder controlling vertical feeds of the machine work table supporting knee, with the manual screw jack for said knee being positioned centrally through said cylinder.

These and other objects will be seen from the following specification and claims in conjunction with the appended drawings of which:

Fig. 2 is a fragmentary elevational section of the combination hydraulic cylinder and knee jack.

Fig. 3 is a fragmentary elevational section illustrating a slightly different type of nut and screw connection.

Figure 1:
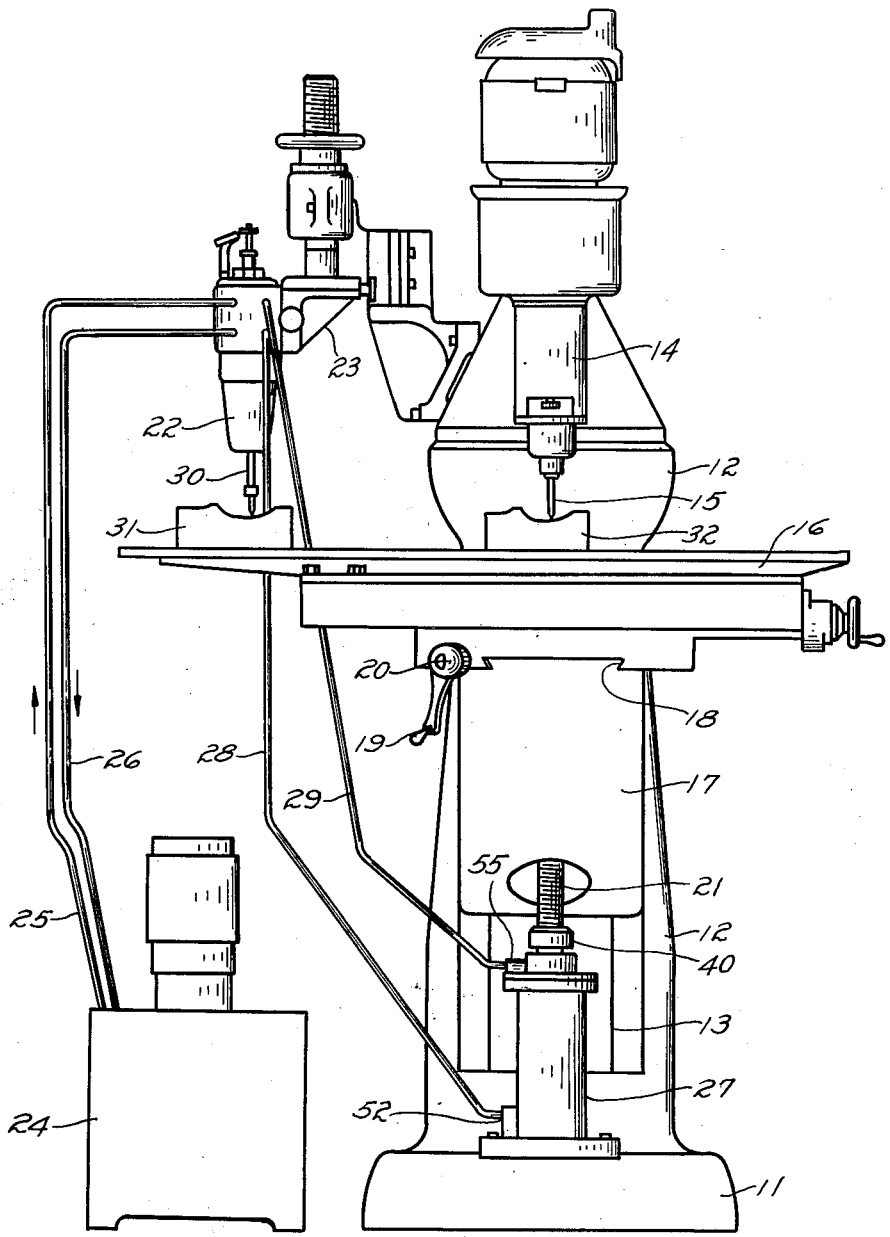
Fig. 1 is a front elevational view of the machine tool showing the combination hydraulic cylinder and jack screw for its work table supporting knee.

It will be understood that the above drawings illustrate merely one preferable embodiment of the invention, and that other embodiments are contemplated within the scope of the claims hereafter set out.

In the drawings, Figure 1, a machine tool is shown consisting of base 11, standard 12 thereon with dovetail 13, and cutter head 14, mounted on said standard, carrying rotary cutting tool 15.

Workpiece and pattern supporting table 16 is mounted on knee 17 and adapted for reciprocal horizontal movements thereon on its dovetail connection 18.

Knee 17 is adjustably mounted on standard 12, and slidably supported upon dovetail means 13 thereon. Knee 17 is adapted to manual vertical adjustments by means of rotary crank 19 which turns shaft 20.

Rotation of said shaft is adapted to effect rotation of knee elevating screw 21, for effecting vertical adjustment of said knee in the manner hereafter set out.

Hydraulic tracer 22, which is adapted to react to the surface of pattern 31 on table 16 is adjustably mounted on bracket arm 23 carried by machine standard 12.

Hydraulic unit 24 includes a pump for supplying fluid under pressure through flexible conduit 25 which joins tracer 22. Exhaust fluid return conduit 26 likewise interconnects tracer 22 and hydraulic unit 24 for returning fluid to the hydraulic unit sump.

Hydraulic cylinder 27 mounted on base 11 in the manner hereafter described, has a moveable piston therein controlled by pressure fluid from the tracer. Said fluid is directed through either conduit 28 or 29 depending upon the operation of the fluid control valve within tracer 22, which is responsive to movements of spindle 30 reacting to the surface of pattern 31 on worktable 16. Said tracer and the moveable spindle operated valve therein operates in the manner fully set out in applicants' Patent No. 2,386,825, dated October 16, 1945, and entitled Tracer mechanism, for effecting reciprocal vertical feed movements of work table 16 which also carries work piece 32 relative to cutter 15.

If pressure fluid is delivered through conduit 28 through the lower end of cylinder 27, the piston therein is forced upwardly, causing upward movement of knee 17; and the fluid in said cylinder above said piston is returned to tracer 22 through conduit 29 for exhausting through conduit 26 back to the hydraulic unit 24.

On the other hand, if pressure fluid is applied to cylinder 27 through conduit 29, the piston in said cylinder is lowered causing knee 17 to descend, and exhaust fluid returns to tracer 22 through conduit 28.

Referring to Figure 2, fragmentarily shown manually rotatable shaft 20 has a bevel gear 33 on its inner end which meshes with bevel gear 34 secured by nut 35 upon the upper end of screw 21. Knee 17 has a horizontal bridge 36 formed therein carrying bushing 37 through which screw 21 is rotatably mounted and journaled, with its annular ledge 21' adapted to operatively engage the bottom of bushing 37.

Hollow piston rod 38, which is adapted to reciprocal vertical movements, has an adapter 39 threadably secured to its upper end. Nut 40 threadably engages jack screw 21, and is secured to the top of adapter 39 by set screws 41. Said nut is adapted to engage the bottom of bridge 36 which forms a part of knee 17, whereby elevation of piston rod 38 will effect a corresponding elevation of knee 17. On the other hand, with piston rod 38 stationary, manual rotary movements of screw 21 relative to nut 40, will result in an elevation or depression of said screw 21 effecting corresponding movements of knee bridge 36 relative to nut 40.

Piston rod 38 within which is mounted screw 21 in spaced relation, slidably projects through the upper cap 42 of cylinder 27 with a suitable packing gland 43 interposed. Lock nut 44 is threaded within the upper hollow annularly flanged portion 45 of cylinder cap 42 and locked in adjusted position therein by locking screw 46.

Said cap is mounted upon the top of cylinder 27 and secured to an annular flange 27' welded thereon, by cap screws 47 arranged adjacent to the periphery thereof. The lower end of cylinder 27 has a bottom cap 48 welded thereto, which in turn is firmly secured to base 11 by cap screws 49.

It will be noted that bottom cap 48 has an upwardly projecting portion 50 with passage 51 communicating at one end with the interior of said cylinder, and with its other end terminating at port 52. Referring to Figure 1, it is seen that conduit 28 from the tracer joins port 52 at the bottom of said cylinder for supplying pressure fluid thereto.

Top cap 42 also has a projecting portion 53 Fig. 2 with passage 54 formed therein communicating with the interior of cylinder 27, with its outer end terminating in port 55. As seen in Figure 1, fluid conduit 29 from tracer 22 is joined to port 55 for supplying pressure fluid to the upper end of said cylinder.

Referring to Figure 2, hollow piston rod 38 extends downwardly into and in space relation to tubular member 56. The latter is welded at its top open end to hollow cylinder cap 48 and extends downwardly into vertical opening 57 in base 11. Tubing 56, being in communication with the interior of cylinder 27, forms an extension thereof providing a receptacle for oil.

Piston 58 welded to hollow piston rod 38, has a packing retainer 59 secured thereto by screws 60. Leather packing rings 61 are positioned between piston 58 and retainer 59 and also between said piston and the inner cylinder wall as well as between said packing ring and said inner cylinder wall. An annular metal backing plate 62 is interposed between the two leather packing rings for maintaining the shape thereof. Bolts 60 act to maintain members 58, 59, 61 and 62 as a single piston unit adapted for reciprocation within cylinder 27 in response to pressure fluid on one side or the other in said cylinder.

It will be noted that suitable split expander rings 63 are employed interposed between piston 58 and its packing 61, and between retainer 59 and its packing 61. Referring to Figure 2, it is seen that rotatable jack screw 21 is nested within hollow piston rod 38. In the lowest position of piston 58 resting on bottom cap 48, a spaced relation is defined between the bottom of said piston rod and tubing 56.

With screw 21 turned to its lowest position relative to nut 40, it is seen that the bottom of said screw is spaced from the bottom of hollow rod 38.

From above description, it is seen that conventional manual elevation or depression of knee 17 is effected by hand crank 19 which produces rotation of jack screw 21 relative to stationary nut 40.

Furthermore, it is seen that tracer tip 30 reacting to the surface of pattern 31 as table 16 is fed transversely, controls the flow of pressure fluid from the tracer out either conduit 28 or 29 to effect automatic raising or lowering of knee 17 entirely independent of jack screw 21.

Referring to Fig. 3, a slightly different type of connection is shown between screw 21, its nut 64, and the cylinder piston rod 38. Hollow piston rod 38, which is adapted to reciprocal vertical movements, has a cap nut 65 threaded to its upper end. Said nut has a central opening 66 through which screw 21 extends.

Nut 64 threadably engaging screw 21 extends down into piston rod 38, and is securely retained therein by cap 65. The annularly flange portion 67 of nut 64 rests upon the top end of piston rod 38, while cap 65 bears down upon the top of said nut to firmly retain the same.

Set screw 68 is threaded through cap 65, and its inner end frictionally engages the sidewall of flange 67 forming part of nut 64 to retain the latter against rotation. Secondary set screw 69 is also threaded through cap 65 with its inner end frictionally engaging the upper end of piston rod 38 to lock said cap in position thereon.

Piston rod 38 is adapted for vertical reciprocal movement through a central opening in upper cap 45 which is secured to the upper end of hydraulic cylinder 27 in the manner shown in Fig. 2.

Packing ring 70 and top and bottom adapters 71 and 72 are carried within cap 45 and interposed between said cap and piston rod 38. Lock nut 73 is threaded down into cap 45 to adjustably and lockingly engage top adapter 71 to effectively seal said cylinder relative to piston rod 38.

With screw 21 manually turned to its lowest position as shown in Fig. 2 it will be seen that annular ledge 21' is spaced from the bottom of bushing 37. Thus, if piston rod 38 is hydraulically elevated, nut 40 engages knee 36 to effect elevation of said knee. However, in almost any other position of screw 21 above its lowest position it will be seen that annular ledge 21' will be sufficiently above the top of nut 40 so that said ledge will engage the bottom of bushing 37 to effect vertical movements of knee 36.

This is the normal situation, so that in most cases, as in Fig. 1, it can be said that screw 21 actually engages knee 36 to effect raising or lowering thereof either manually on rotation of handle 19, or hydraulically on vertical movements of piston rod 38 which supports said screw.

Having described our invention, reference should now be had to the claims which follow for determining the scope thereof.

We claim:

1. A jack comprising a hydraulic cylinder, a reciprocal piston therein, a hollow rod in said cylinder closed at its lower end, joined to and extending from opposite sides of said piston and projecting outwardly from said cylinder, and a manually rotating screw threadedly engaging within said rod and projection therefrom, said cylinder having a hollow extension at its lower end to receive the closed end of said rod when said piston and screw are in their lowest positions.

2. A jack comprising a hydraulic cylinder, a reciprocal piston therein, a hollow rod in said cylinder joined to said piston and projecting therethrough and out from said cylinder, a nut with an elongated cylindrical shank projected down into and carried by said rod, an adapter on said shank and threadedly secured to said rod, set screws extending through said nut and threadedly engaging said adapter adapted to retain said nut relatively to said rod, and a manually rotatable screw within said rod threadedly engaging said nut and adapted for movement relatively to said cylinder.

3. A jack comprising a hydraulic cylinder, a reciprocal piston therein, a hollow rod in said cylinder joined to said piston and projecting therethrough and out from said cylinder, a nut with an elongated cylindrical shank projected down into and carried by said rod, a hollow cap nut extending over the top of said nut and over said rod, being threadedly joined to said rod, transverse set screws extending through said cap nut retainingly engaging respectively said nut and said rod, and a manually rotatable screw within said rod threadedly engaging said nut and projected loosely through said cap nut and adapted for vertical movements relatively to said cylinder.

MANUEL TURCHAN.
CURTIS WALKER.

REFERENCES CITED

The following references are of record in the file of this patent:

UNITED STATES PATENTS

| Number | Name | Date |
| --- | --- | --- |
| 1,228,586 | Mulvihill | June 5, 1917 |
| 1,463,654 | McNulty | July 31, 1923 |
| 1,925,652 | Bolens | Sept. 5, 1933 |
| 2,352,390 | Kirkland | June 27, 1944 |

FOREIGN PATENTS

| Number | Country | Date |
| --- | --- | --- |
| 464,306 | Great Britain | Apr. 15, 1937 |